Oct. 14, 1930.                J. KLINGELE                1,778,639
                             TRAVELING SAW
                          Filed June 4, 1929        2 Sheets-Sheet 1

INVENTOR
John Klingele
BY
ATTORNEY

Oct. 14, 1930.  J. KLINGELE  1,778,639
TRAVELING SAW
Filed June 4, 1929   2 Sheets-Sheet 2
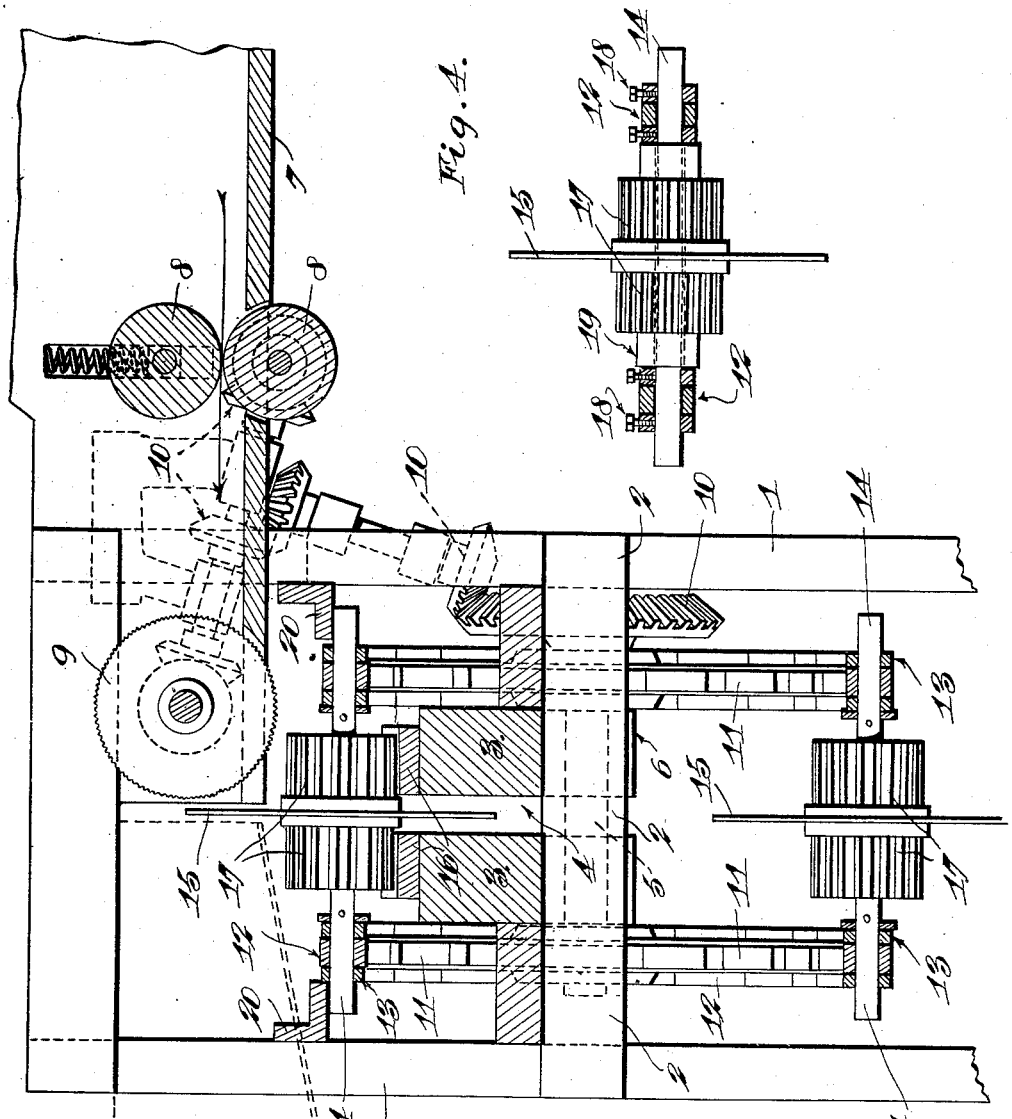
INVENTOR
John Klingele
BY
ATTORNEY Patented Oct. 14, 1930

1,778,639

UNITED STATES PATENT OFFICE

JOHN KLINGELE, OF YAKIMA, WASHINGTON

TRAVELING SAW

Application filed June 4, 1929. Serial No. 368,267.

The invention primarily has for its object to provide a novel means in the nature of a traveling saw adapted for cutting into fine pieces, brush or the like, for fuel or for being worked into the soil as fertilizer, or for similarly cutting corn stalks or similar material for use as ensilage.

In its more detailed nature the invention resides in the provision of an endless carrier for moving one or a plurality of saw units through a circuitous path, means being provided for supporting and feeding the material into position for being engaged by the saw or saws, and other means being provided to impart sawing motion to the saws as they are passing the position at which they engage the material.

Another object of the invention is to provide means to longitudinally divide or slit the material as it is being fed into position for being engaged by the saws.

Other objects will in part be obvious and in part be pointed out hereinafter.

To the attainment of the aforesaid objects and ends, the invention further resides in the novel details of construction, combination and arrangement of parts, all of which will be first fully described in the following detailed description, then be particularly pointed out in the appended claims, reference being had to the accompanying drawings, in which:—

Figure 2 is a central vertical cross section taken on the line 2—2 on Figure 1.

Figure 3 is an enlarged detail view illustrating one means for mounting the chain-carried shaft ends.

Figure 4 is a detail view illustrating a modified mounting for the chain carried cross shafts.

Figure 1:
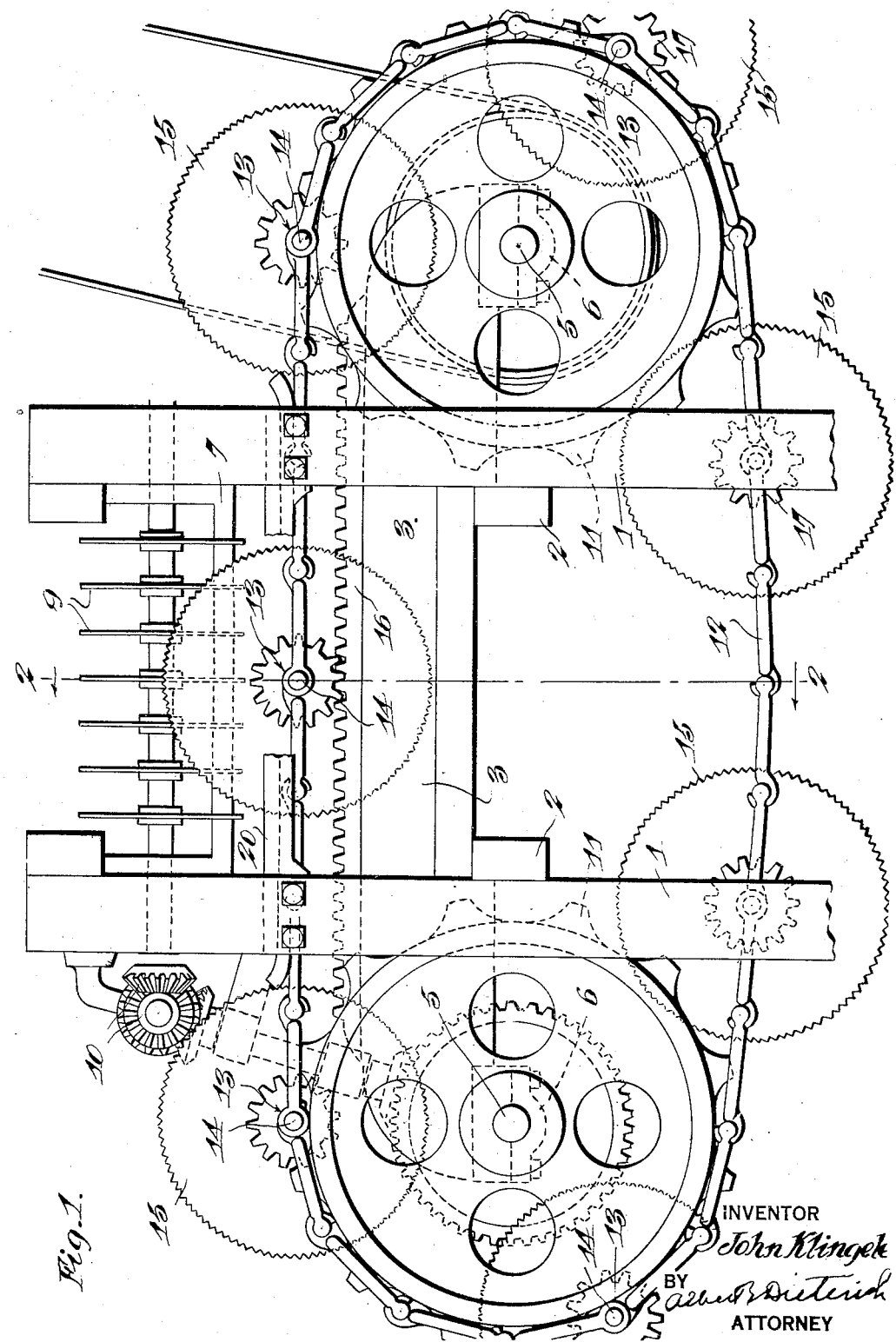
Figure 1 is a side elevation illustrating the invention.

In the practical development of the invention I provide vertical frame standards 1 which are joined in opposing pairs by connecting cross bolsters 2 upon which longitudinal bed beams 3 are mounted. The bed beams are spaced apart as at 4 to provide a split bed. The purpose of thus splitting the bed will be evident as the description proceeds.

End cross shafts 5 are provided and each is rotatably mounted in bearings 6 secured across the respective ends of the bed beams 3.

A work supporting and delivering trough 7 is provided and is supported by certain of the beams 1 in position for delivering the work (brush, corn stalks or the like) at a point just above the bed split 4. The work may be fed through the trough 7 by opposed feed rollers 8. One of the rollers 8 may be positively driven and the other yieldably pressed against the driven roller in the manner illustrated in Figure 2 of the drawings. As the material is fed through the rollers 8 it comes into engagement with a plurality of separating or slitting saws or knives 9 which rotate in a vertical plane about a horizontal axis adjacent the delivery end of the trough 7 as illustrated in Figures 1 and 2 of the drawings. Rapid rotation may be imparted to the rollers 8 and splitters 9 by power transmission connections 10 with one of the cross shafts 5. Power is imparted to one of the cross shafts in any approved manner as by pulley and belt connection as indicated in Figure 1 of the drawings.

Sprockets 11 are mounted on the respective cross shafts 5 in aligned pairs and endless chains 12, preferably of the square detachable link type, pass around aligned pairs of the sprockets and are caused to move in circuitous paths as the driven sprocket is rotated.

At spaced intervals the chain carries special U-shaped links which include eyes 13 which, together with the respective connecting hooks of the adjacent links form journals in which traveling cross shafts 14 are rotatably mounted in the manner illustrated in Figures 2 and 3 of the drawings. A rotary saw 15 is secured centrally of each shaft 14 so as to be rotated when the shaft 14 by which it is carried is rotated.

A pair of racks 16 are secured upon the upper edges of the bed beams 3 in position for being engaged by gears 17 secured upon the cross shafts 14 at opposite sides of the saws 13. These racks extend beneath the position of the work trough 7 so that as the chain flights pass over that portion of their travel, the gears 17 will mesh with the racks and impart rotation to the shafts 14 and saws 15 carried thereby. During this rotation the material being fed from the end of the trough 7, and which has previously been slit longitudinally by the members 9, is cut transversely into very small pieces. When brush or similar material is fed through the trough the pieces are cut suitably for use as fuel or for being worked into the ground as fertilizer and when corn stalks or the like are fed through the trough they are cut in suitable condition for being stored in a silo as cattle feed. In addition to their function as longitudinal slitters the members 9 also serve as lateral abutments to hold the fed material while being cut by the traversing saws 15.

In Figure 4 of the drawings I have disclosed a slightly modified form of the invention in which the cross shafts 14 may be rigidly carried by the chains instead of being rotatable in the chain journals. In this form the said shafts may be secured rigidly to the chains as at 18 and the gears 17 and saws 15 may be carried by sleeves 19 rotatably mounted on the said shafts.

It may also be found desirable to provide a guard rail 20 under which the extended ends of the shafts 14 may ride as illustrated in Figure 2 of the drawings to assure proper meshing of the gears 17 with the racks 16 while passing under the work trough.

If desired a cut material gathering and delivery chute 21 may be provided and mounted to form a continuation of the trough 7 as indicated in dotted lines in Figure 2 of the drawings. Thus positioned the chute 21 will serve not only to gather and deliver the cut material but also to guard the moving parts of the device, as for example the gears and chains, against becoming clogged by the cut material. Other guards for the traveling chains and gears may be provided if desired, but since it is well known to provide guards for such moving parts detail disclosure of this feature is deemed to be unnecessary.

From the foregoing description, taken in connection with the accompanying drawings, it is thought that the novel details of construction, the manner of use and the advantages of my invention will be readily apparent to those skilled in the art to which it relates.

What I claim is:

1. The combination with a stationary work support, of a rotary saw, and means to move the saw transversely in a circuitous path past the work support continuously and bodily in one direction only, and means to impart rotation to the saw only during its movement past the work support.

2. The combination with a work support, a split bed, a rack at each side of the split of the bed, a pair of sprockets arranged in spaced relation at each end of the bed and aligned in opposite end pairs, a chain passing over and driven by each aligned end pair of sprockets, a cross shaft carried transversely by the pair of chains, a pair of gears on the cross shaft one in position for engaging each rack as the chains pass the work support, and a rotary saw carried by the cross shaft in position for passing through the bed split and adapted to be rotated each time the gears and rack come into engagement.

3. In a device of the character described, a pair of chains disposed in spaced relation, means to move the chains in a circuitous path, a cross shaft positioned transversely of and supported in bearings carried by the chains, a rotary saw carried by the shaft, means to impart rotation to the saw during travel of the chains, said last named means comprising gears mounted on the shaft at respective sides of the saw, bed portions over which the chains pass during their travel, racks, on the bed portions in position for being engaged by the gears, means to feed work across the path of travel of the saw opposite the racks, and means to slit the work while being fed.

4. In a device of the class described, vertical frame standards, cross bolsters connecting pairs of standards, longitudinal bed beams mounted on said cross bolsters and spaced apart to provide a split bed, said bed beams extending beyond said vertical standards and having bearings, cross shafts mounted in said bearings, sprockets mounted on the cross shafts in aligned pairs, endles chains taking over said sprockets, certain of the links of said chains having bearing eyes in which are journalled saw carrying shafts, disk saws on said saw carrying shafts, a gear mounted on each of said saw carrying shafts at each side of the disk saws, a pair of rack bars mounted on the top of said bed beams and terminating short of the ends thereof, guard rails mounted on said standards adjacent said rack bars and engaging the ends of said saw carrying shafts to hold said gears in mesh with said rack bars during the passage of the saws past the work, and a transverse work support mounted on said standards for delivering the work to the saws in a direction at right angles to the path of travel of the saws, and means for driving said sprockets and chain for the purpose specified.

JOHN KLINGELE.